United States Patent
Zakarauskas (12)

(10) Patent No.: US 6,243,322 B1
(45) Date of Patent: Jun. 5, 2001

(54) METHOD FOR ESTIMATING THE DISTANCE OF AN ACOUSTIC SIGNAL

(75) Inventor: Pierre Zakarauskas, Vancouver (CA)

(73) Assignee: WaveMakers Research, Inc., Vancouver (CA)

( * ) Notice: Subject to any disclaimer, the term of this patent is extended or adjusted under 35 U.S.C. 154(b) by 0 days.

(21) Appl. No.: 09/434,781

(22) Filed: Nov. 5, 1999

(51) Int. Cl.⁷ .................................................... G01S 3/80
(52) U.S. Cl. ............................................. 367/127; 367/124
(58) Field of Search ................................... 367/127, 124; 381/92; 702/233, 238

(56) References Cited

U.S. PATENT DOCUMENTS

| | | | |
|---|---|---|---|
| 4,312,053 * | 1/1982 | Lipsky | 367/127 |
| 5,673,327 * | 9/1997 | Julstrom | 381/92 |
| 5,778,082 | 7/1998 | Chu et al. | 381/92 |
| 6,160,758 * | 12/2000 | Spiesberger | 367/127 |

* cited by examiner

Primary Examiner—Daniel T. Pihulic
(74) Attorney, Agent, or Firm—Coudert Brothers

(57) ABSTRACT

A system and method for detecting the range of an acoustic source within a reverberant space. The invention includes a method, apparatus, and computer program to determine whether a sound source is situated near or far from a pair of microphones situated within a reverberant space. A signal detector is applied to the data; only the data that passes the signal detector is processed any further. The signal at the two microphones is compared to obtain the angular distribution of acoustic power. The concentration of acoustic power in the direct path versus reverberant paths is determined and used to compute a direct-to-reverberant ratio. If this ratio is greater than a selected threshold, the sound source is determined to be near the microphones. Otherwise, the sound source is determined to be far from the microphones.

12 Claims, 4 Drawing Sheets distance estimation

Source near microphones

Source far from microphones distance estimation

METHOD FOR ESTIMATING THE DISTANCE OF AN ACOUSTIC SIGNAL

TECHNICAL FIELD

This invention relates to systems and methods for estimating the distance of the source of an acoustic signal within a reverberant space.

BACKGROUND

In the area of human-machine speech interface, or in hands-free telecommunication such as audio phones, it is usually desired to process only the voice of the speaker(s) that are close to a microphone, and ignore background noise. Some degree of interference rejection can be achieved through the use of a voice detector, such as the ones described in U.S. patent application Ser. No. 09/375,309, entitled "METHOD FOR ENHANCEMENT OF ACOUSTIC SIGNAL IN NOISE" and U.S. patent application Ser. No. 09/385,975, entitled "SYSTEM AND METHOD FOR CLASSIFICATION OF SOUND SOURCES", both of which are assigned to the assignee of the present invention. However, such voice detectors still let voice interference's, such as remote conversations, television sets, and public announcement systems, be processed.

Most prior art approaches rely on sound volume (loudness) to determine whether a sound source is sufficiently near the microphone to warrant processing it. However, even though the volume of a source is somewhat correlated to its distance to a microphone, a distant loud source can often be perceived as louder than a weaker, albeit closer source.

Another way to determine the range of an acoustic source is to use triangulation through the use of several pairs of microphones. This approach is computationally onerous, and necessitates much significant additional hardware.

The inventor has determined that it would be desirable to be able to estimate the range of a sound source independently of its inherent loudness using only two microphones. The present invention provides a system and method for determining the range of an acoustic signal within a reverberant space that avoids the limitations of prior techniques.

SUMMARY

The invention includes a method, apparatus, and computer program to determine whether a sound source is situated near or far from a pair of microphones situated in a reverberant space. The input signal may represent human speech, but it should be recognized that the invention could be used to localize any type of acoustic data, such as musical instruments and transient noise.

The preferred embodiment of the invention localizes input signals as follows. Sound input signals from a pair of microphones are digitized into binary data. A signal detector is applied to the data; only the data that passes the signal detector is processed any further. The signal at the two microphones is compared to obtain the angular distribution of acoustic power. The concentration of acoustic power in the direct path versus reverberant paths is determined and used to compute a direct-to-reverberant ratio. If this ratio is greater than a threshold, the source is determined to be near the microphones. Otherwise, the source is determined to be far from the microphones, and ignored by the system.

More particularly, in one aspect, the invention includes a method for estimating the distance of an acoustic signal within a reverberant space utilizing two microphones, including: optionally passing the acoustic signal through a signal detector to discriminate against noises that are not of the same class as the acoustic signal; determining the angular distribution of acoustic power from the acoustic signal with respect to the two microphones; estimating the direct-to-reverberant ratio from the angular distribution of acoustic power; optionally passing the direct-to-reverberant ratio through a threshold detector; and outputting an indication as to whether the distance of the acoustic signal to the pair of microphones is near or far based on the output of the threshold detector.

The invention has the following advantages: since the direct-to-reverberant ratio is independent of source volume or loudness, the range estimate will also be independent of volume; and, the invention needs only two microphones to work.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Throughout this description, the preferred embodiment and examples shown should be considered as exemplars rather than as limitations of the invention.

Overview of Operating Environment

Figure 1:
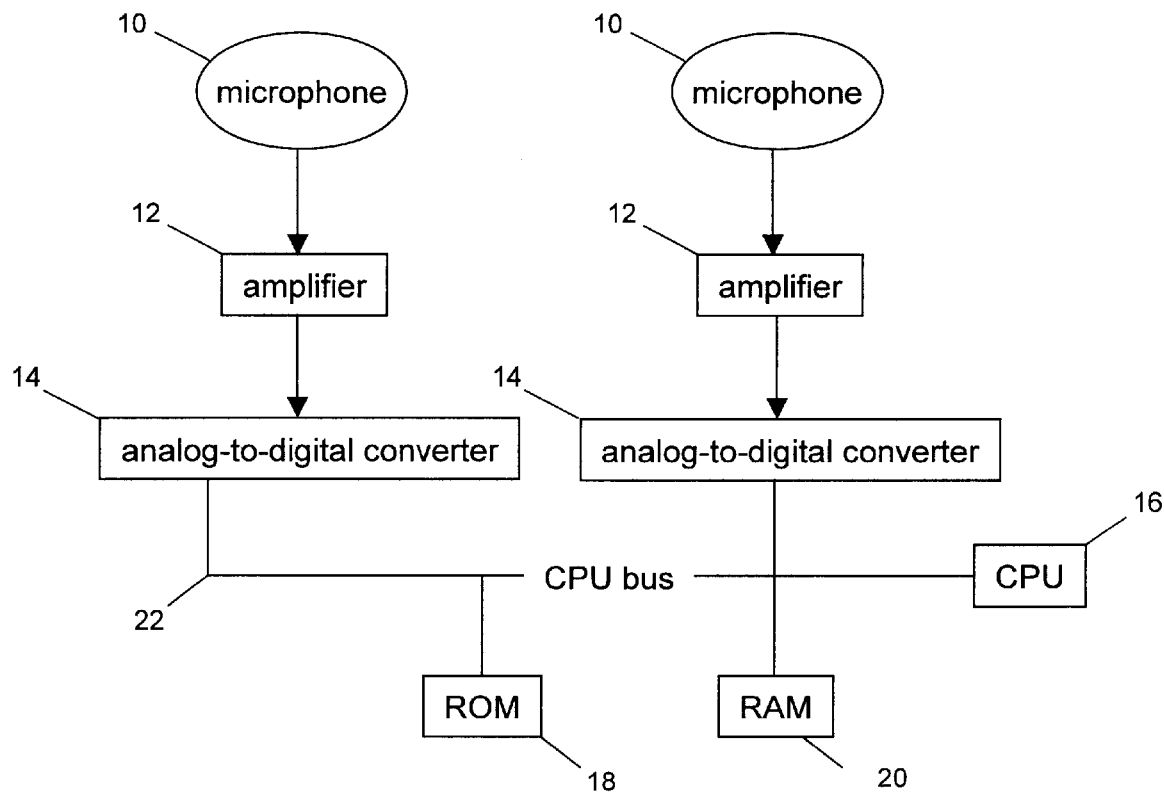
FIG. 1 is block diagram of a prior art programmable computer system suitable for implementing the signal enhancement technique of the invention.

FIG. 1 shows a block diagram of a typical prior art programmable processing system that may be used for implementing the signal enhancement system of the invention. An acoustic signal is received at a pair of transducer microphones 10, which each generate a corresponding electrical signal representation of the acoustic signal. The signal from the transducer microphones 10 is then preferably amplified by corresponding amplifiers 12 before being digitized by corresponding analog-to-digital converters 14. The output of each analog-to-digital converter 14 is applied to a processing system that applies the enhancement techniques of the invention. The processing system preferably includes a CPU 16, RAM 20, ROM 18 (which may be writable, such as a flash ROM), coupled by a CPU bus 22 as shown. The output of the localization process can be applied to other processing systems, such as an automatic speech recognition system, or transmitted for the benefit of a remote listener, or captured by a recording system.

Functional Overview of System

The following describes the functional components of an acoustic signal enhancement system. An optional component of the invention is a signal detector function. This step allows the system to discriminate against noises that are not of the same class as the signal. For speaker localization, a voice detector is applied at this step.

The next functional component of the system is the determination of the distribution of acoustic power as a function of angle relative to the two microphones 10. This is done by comparing the time difference (time lag) between the input from the two microphones 10, because the time lag corresponds to an angle of incidence of acoustic power. Thus, the acoustic power as a function of angle is estimated by measuring acoustic power as a function of time lag.

A direct-to-reverberant ratio (DTR) is then determined from the angular acoustic power distribution. This is done by assuming that the power at or near the peak of the angular distribution is from the direct path between the sound source and the microphones 10, and that the rest of the angular power distribution comes from the reverberant paths originating at the source and around a space (e.g., a room) confining or enclosing the microphones 10. Most of those paths will arrive at the microphones 10 from angles different from that of the direct path. The ratio of the power between the direct path and the rest of the power distribution is a measure of the DTR. The DTR can be used to estimate source range.

Figure 2:
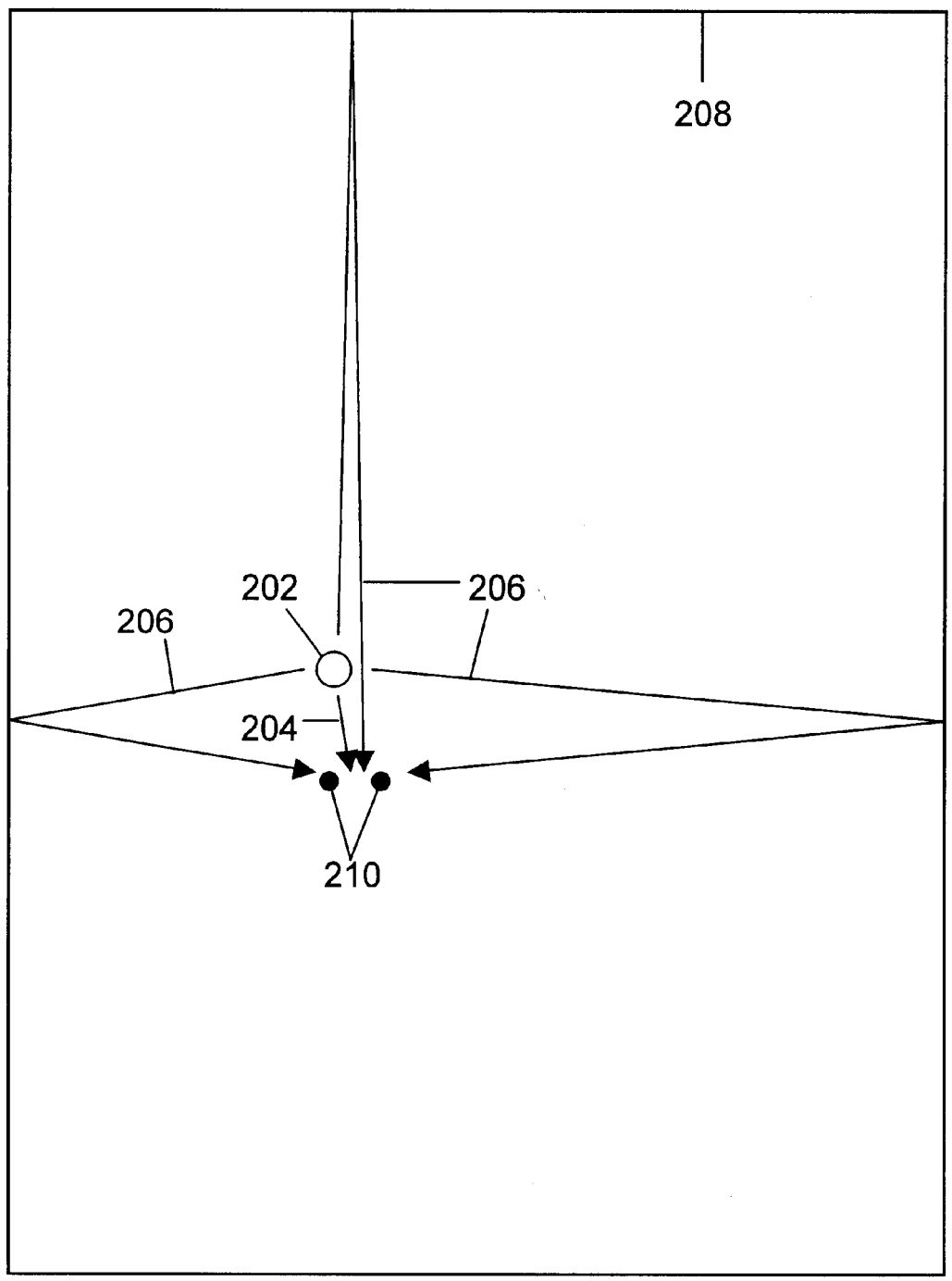
FIG. 2 is a diagram that depicts direct and reflected sound rays for a source near the a pair of microphones.
Figure 3:
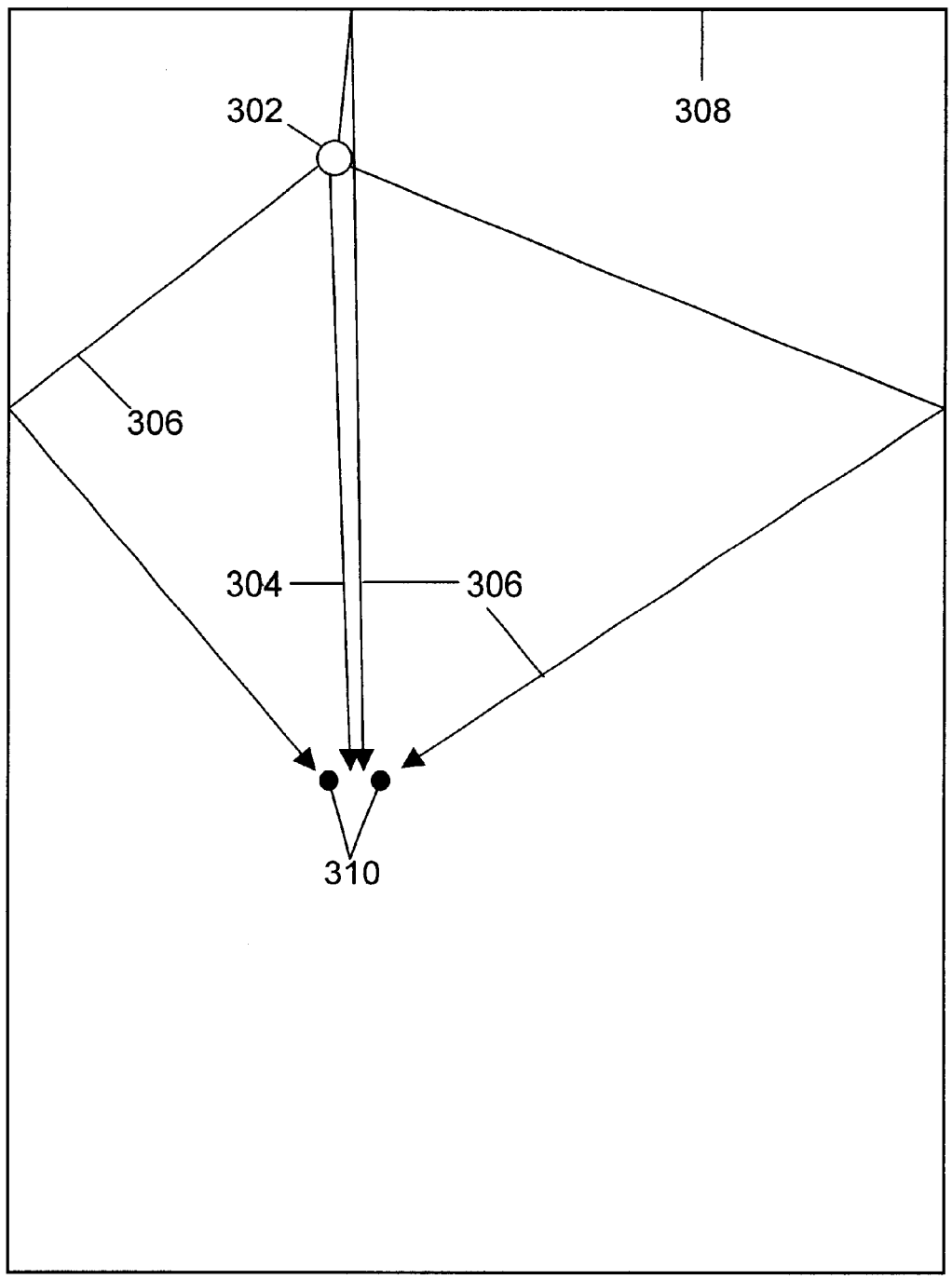
FIG. 3 is a diagram that depicts direct and reflected sound rays for a source far from a pair of microphones.

FIG. 2 is a diagram that depicts direct and reflect sound rays for a source near the a pair of microphones. FIG. 3 is a diagram that depicts direct and reflected sound rays for a source far from a pair of microphones. In FIG. 2, a sound source 202 emits sound along a direct path 204 toward a pair of microphones 210, and along multiple indirect paths 206 such that the sound first reflects from the walls 208 of a reverberant space before being directed toward the microphone pair 210. In this case, the sound along the direct path 204 is relatively loud compared to the sound from the reflected paths 206. FIG. 3 represents the analogous situation when a sound source 302 is situated far from a microphone pair 310. The sound source 202 emits sound along a direct path 304 toward the microphone pair 310, and along multiple indirect paths 306 such that the sound first reflects from the walls 308 of a reverberant space before being directed toward the microphone pair 310. In this case, the sound along the direct path 304 is relatively weak compared to the sound from the reflected paths 306. Depending on the angle of reflection and the placement of the sound source, the sound from along both the direct and indirect paths will impinge on the two microphones at different times, resulting in a time lag.

In the illustrated embodiment, the DTR value may be compared against a preset but adjustable threshold. If the DTR value is greater than the threshold, the sound source is determined to be in the distant field. On the other hand, if the DTR value is smaller than the threshold, the sound source is determined to be in the near field. An indication is output as to whether the distance of the sound source to the pair of microphones is near or far.

Overview of Basic Method

Figure 4:
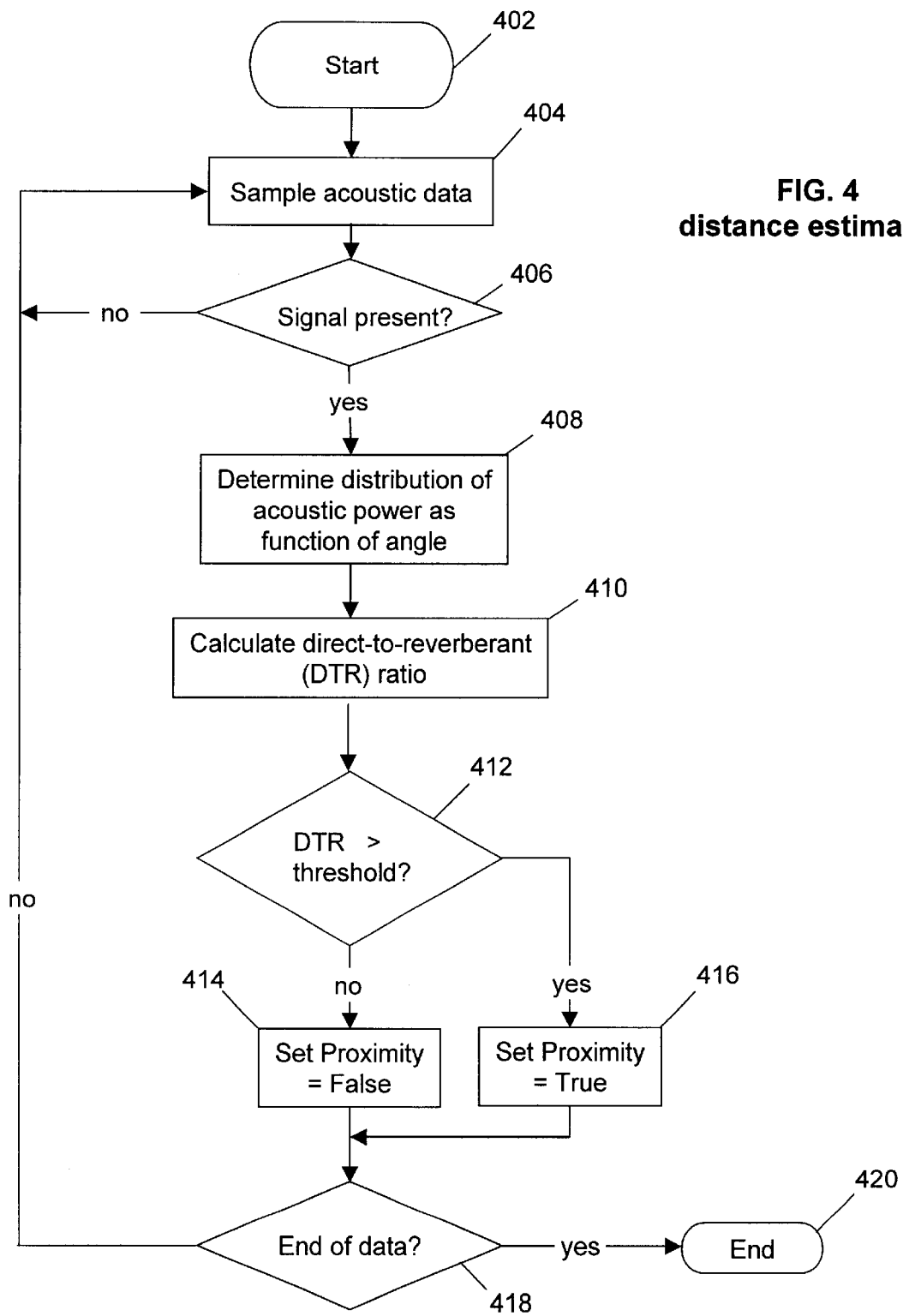
FIG. 4 is a flow diagram showing the basic method of the preferred embodiment of the invention.

FIG. 4 is a flow diagram of the preferred method embodiment of the invention. The method shown in FIG. 4 is used for determining the range of an incoming acoustic signal, which consists of a plurality of data samples generated as output from the analog-to-digital converters 14 shown in FIG. 1. The method begins at a Start state (Step 402). The incoming data stream is read into a computer memory as a set of samples (Step 404). In the preferred embodiment, the invention normally would be applied to enhance a "moving window" of data representing portions of a continuous acoustic data stream, such that the entire data stream is processed. Generally, an acoustic data stream to be enhanced is represented as a series of data "buffers" of fixed length, regardless of the duration of the original acoustic data stream. A typical practical buffer length is 1024 data points.

The data is then optionally applied to a signal detector function (Step 406). This step allows the system to discriminate against noises that are not of the same class (i.e., relative volume) as the desired signal. For speech enhancement, a voice detector is applied at this step. Examples of such voice detectors are described in U.S. patent application Ser. No. 09/375,309, entitled "METHOD FOR ENHANCEMENT OF ACOUSTIC SIGNAL IN NOISE" and U.S. patent application Ser. No. 09/385,975, entitled "SYSTEM AND METHOD FOR CLASSIFICATION OF SOUND SOURCES", both of which are assigned to the assignee of the present invention, the teachings of which are hereby incorporated by reference.

The data that has passed through the signal detector is then used to determine the distribution of acoustic power as a function of angle (Step 408). The preferred embodiment uses the sound localization method described in U.S. Pat. No. 5,526,433, the teachings of which are hereby incorporated by reference. The output of the sound localization is a distribution $P(\tau)$ of power as a function of time lag $\tau$.

The DTR is then computed from the acoustic power distribution $P(\tau)$ (Step 410). A preferred embodiment of a DTR estimator is described below.

Assume that $P(\tau)$ is a discrete function of time lag $\tau$, corresponding to a finite number of possible time lags between the two microphones 10, with $-T \leq \tau \leq T$. First, locate the time lag of maximum power, i.e., the time lag $\tau_{max}$ for which $P(\tau_{max}) > P(\tau); \forall \tau \neq \tau_{max}$.

Define the power in the direct path to be $P_d = P(\tau - \Delta\tau) + P(\tau) + P(\tau + \Delta\tau)$, and the power in the reverberant paths to be $$P_r = \sum_{-T}^{\tau - 2\Delta\tau} P(\tau) + \sum_{\tau + 2\Delta\tau}^{T} P(\tau).$$

With these definitions, $DTR = P_d/P_r$.

Each DTR value is then optionally compared against a preset but adjustable threshold (Step 412). If the DTR value is greater than the threshold, the source is declared to be in the distant field (i.e., proximity=false) (Step 414). On the other hand, if the DTR value is less than the threshold, the source is declared to be in the near field (i.e., proximity=true) (Step 416). The threshold value may be user selected, based on empirical experience. In the alternative, other techniques may be used to generate an indication as to whether the distance of the acoustic signal to the pair of microphones is near or far based on the direct-to-reverberant ratio. For example, a training phase could be used for the system to set the threshold while the user speaks while being alternatively close and far from the microphones.

If any of the input data remains to be processed (Step 418), then the entire process is repeated on a next sample of acoustic data (Step 404). Otherwise, processing ends (Step 420). The final output is a decision or indication as to whether the distance of the sound source to the pair of microphones is near or far. Such information is useful for deciding whether to process voiced commands (e.g., at a kiosk in an airport), or transmit voice to a remote listener in a hands-free communication system.

Computer Implementation

The invention may be implemented in hardware or software, or a combination of both (e.g., programmable logic arrays). Unless otherwise specified, the algorithms included as part of the invention are not inherently related to any particular computer or other apparatus. In particular, various general-purpose machines may be used with programs written in accordance with the teachings herein, or it may be more convenient to construct more specialized apparatus to perform the required method steps. However, preferably, the invention is implemented in one or more computer programs executing on programmable systems each comprising at least one processor, at least one data storage system (including volatile and non-volatile memory and/or storage elements), and at least two microphone inputs. The program code is executed on the processors to perform the functions described herein.

Each such program may be implemented in any desired computer language (including machine, assembly, high level procedural, or object oriented programming languages) to communicate with a computer system. In any case, the language may be a compiled or interpreted language.

Each such computer program is preferably stored on a storage media or device (e.g., solid state, magnetic or optical media) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the invention have been described. Nevertheless, it will be understood that various modifications may be made without departing from the spirit and scope of the invention. For example, some of the steps of the algorithms may be order independent, and thus may be executed in an order other than as described above. Accordingly, other embodiments are within the scope of the following claims.

What is claimed is:

1. A method for estimating the distance of an acoustic signal within a reverberant space utilizing two microphones, including:
   (a) determining an angular distribution of acoustic power from the acoustic signal with respect to the two microphones;
   (b) estimating a direct-to-reverberant ratio from the angular distribution of acoustic power; and
   (c) outputting an indication as to whether the distance of the acoustic signal to the pair of microphones is near or far based on the direct-to-reverberant ratio.

2. The method of claim 1, further including, before determining the angular distribution of acoustic power, passing the acoustic signal through a signal detector to discriminate against noises that are not of the same class as the acoustic signal.

3. The method of claim 1, further including passing the direct-to-reverberant ratio through a threshold detector.

4. The method of claim 1, further including:
   (a) before determining the angular distribution of acoustic power, passing the acoustic signal through a signal detector to discriminate against noises that are not of the same class as the acoustic signal; and
   (b) passing the direct-to-reverberant ratio through a threshold detector.

5. A system for estimating the distance of an acoustic signal within a reverberant space utilizing two microphones, including:
   (a) means for determining an angular distribution of acoustic power from the acoustic signal with respect to the two microphones;
   (b) means for estimating a direct-to-reverberant ratio from the angular distribution of acoustic power; and
   (c) means for outputting an indication as to whether the distance of the acoustic signal to the pair of microphones is near or far based on the direct-to-reverberant ratio.

6. The system of claim 5, further including means for passing the acoustic signal through a signal detector to discriminate against noises that are not of the same class as the acoustic signal.

7. The system of claim 5, further including means for passing the direct-to-reverberant ratio through a threshold detector.

8. The system of claim 5, further including:
   (a) means for passing the acoustic signal through a signal detector to discriminate against noises that are not of the same class as the acoustic signal; and
   (b) means for passing the direct-to-reverberant ratio through a threshold detector.

9. A computer program, residing on a computer-readable medium, for estimating the distance of a digitized acoustic signal derived from two microphones within a reverberant space, the computer program comprising instructions for causing a computer to:
   (a) determine an angular distribution of acoustic power from the acoustic signal with respect to the two microphones;
   (b) estimate a direct-to-reverberant ratio from the angular distribution of acoustic power; and
   (c) output an indication as to whether the distance of the acoustic signal to the pair of microphones is near or far based on the direct-to-reverberant ratio.

10. The computer program of claim 9, further including instructions for causing the computer to discriminate against noises in the acoustic signal that are not of the same class as the acoustic signal.

11. The computer program of claim 9, further including instructions for causing the computer to apply a threshold test to the direct-to-reverberant ratio.

12. The computer program of claim 9, further including instructions for causing the computer to:
   (a) discriminate against noises in the acoustic signal that are not of the same class as the acoustic signal; and
   (b) apply a threshold test to the direct-to-reverberant ratio.

* * * * *